United States Patent
Fautier et al.

[11] Patent Number: 5,828,412
[45] Date of Patent: Oct. 27, 1998

[54] METHOD AND RECEIVING APPARATUS FOR DECODING COMPRESSED FRAMES

[75] Inventors: Thierry Fautier, Nogent; David Molter, Creteil, both of France

[73] Assignee: U.S. Philips Corporation, New York, N.Y.

[21] Appl. No.: 568,773

[22] Filed: Dec. 7, 1995

[30] Foreign Application Priority Data

Dec. 7, 1994 [FR] France .................................. 9414727

[51] Int. Cl.$^6$ .................................................. H04N 7/36
[52] U.S. Cl. ............................................. 348/415; 348/409
[58] Field of Search .................................. 348/384, 390, 348/401, 409, 415, 420, 412, 407, 716, 718, 715; 382/232, 233, 236, 238

[56] References Cited

U.S. PATENT DOCUMENTS 5,347,308  9/1994  Wai ........................................ 348/420
5,386,233  1/1995  Keith ...................................... 348/407
5,539,466  7/1996  Igarashi et al. ....................... 348/412

FOREIGN PATENT DOCUMENTS

0618722A1  10/1994  European Pat. Off. ....... H04N 5/907

*Primary Examiner*—Amelia Au
*Attorney, Agent, or Firm*—Laurie E. Gathman

[57] ABSTRACT

There are frames of three types, namely intraframes (I0), predicted frames (P3, P6) and interpolated or bidirectional frames (B1, B2). Each bidirectional frame is decoded twice in succession, a first time ($1^1$) for obtaining a first field (1e) and displaying it as its decoding proceeds, while the second field is obtained in the course of the same decoding operation but is not used, and subsequently a second time ($1_2$) for obtaining the second field (1o) and displaying it progressively. As the bidirectional frames are decoded and displayed in lines of blocks, the lines of blocks which are being decoded are located progressively in a memory, each time in place of a line of blocks whose contents have been displayed.

12 Claims, 4 Drawing Sheets

METHOD AND RECEIVING APPARATUS FOR DECODING COMPRESSED FRAMES

BACKGROUND OF THE INVENTION

1. Field Of The Invention

The invention relates to a method of decoding frames which have been encoded digitally while using compression, in which the number of pixels to be treated per unit of time is fixed, a frame is divided into blocks of pixels each comprising several pixels in each horizontal and vertical direction, a plurality of blocks which, side by side, occupy the length of a frame line referred to as a line of blocks, said compression being based on a treatment in blocks transmitted sequentially, while a frame can be defined in at least three ways, namely intraframes which are encoded in absolute values without reference to other frames, predicted-type frames which are encoded with reference to a preceding intraframe or predicted frame, and bidirectional frames which are encoded on the basis of a maximum number of two other frames which are each intraframes or predicted frames.

In this method each frame is displayed after decoding in the form of an even field and an odd field, certain bidirectional frames are displayed before one of the intraframes or predicted frames used for decoding, the bidirectional frames are decoded in successive stages of one line of blocks at a time, while a memory space divided into zones each having a capacity of one line of blocks is provided for storing lines of blocks of a bidirectional frame which has just been decoded, and the contents of one of said zones already displayed are progressively replaced in the memory by each line of blocks which has just been displayed.

The invention also relates to a receiving apparatus which is provided with means for decoding frames which have been encoded digitally while using compression, and with means for displaying each frame after decoding in the form of an even field and an odd field, and for displaying certain bidirectional frames before one of the intraframes or predicted frames used for decoding, means for decoding the bidirectional frames in successive stages of one line of blocks at a time, while a memory space divided into zones each having a capacity of one line of blocks is provided for storing lines of blocks of a bidirectional frame which has just been decoded, and means for progressively replacing the contents of one of said zones already displayed in the memory by a line of blocks which has just been decoded.

The invention is applicable in digital television of standard definition or high definition.

2. Description Of The Prior Art

The algorithms of decompressing frames having a low rate use temporal treatments which necessitate a considerable memory capacity. The temporal process of display is different from that of the decoding operation: since the decoder operates in the frame mode, two fields are jointly decoded, whereas they are displayed one after the other, which is the reason why an entire frame is stored in the memory for consecutively reading the two fields from this memory with a view to their display. Such a method of decoding compressed frames is described in patent application FR-A-2 703 535. The method described in this document allows the use of less memory capacity because the bidirectional frames are decoded in successive stages of one line of blocks at a time, and a line of blocks whose contents have already been displayed is therefore progressively replaced by the lines of blocks which are being decoded.

SUMMARY OF THE INVENTION

The invention provides a method and a receiving apparatus which are even more economical, at an average cost of the decoder and the memory, with which the decoded frames can be stored in a memory having a minimum size without complicating the control means of this memory. It provides an extra reduction of the memory space required for storing bidirectional frames.

This object is achieved in that each bidirectional frame is decoded at least twice in succession, while decoding of a frame is realised for each field to be displayed, the display of one of the fields, even or odd, derived from the contents of the first decoding operation starts before half the period of the first decoding operation, and the display of the other field, odd or even, respectively, derived from the contents of the second decoding operation starts in its turn before half the period of the second decoding operation.

To carry this method into effect, the apparatus is provided with means for decoding each bidirectional frame at least twice in succession and realising decoding of a frame for each field to be displayed, and means for starting the display of one of the fields, even or odd, derived from the contents of the first decoding operation, before half the period of the first decoding operation and for starting in its turn the display of the other field, odd or even, respectively, derived from the contents of the second decoding operation, before half the period of the second decoding operation.

The invention thus benefits from the fact that the frame compression algorithms act on frames which are constituted by two fields (even and odd), and the basic idea of the invention is not to store a single field of the bidirectional frame but only several lines of blocks due to the fact that the bidirectional frames can be decoded twice faster than the others, which provides the possibility of realising this decoding operation twice in succession within the period of a frame. Only the even field is then written into the memory during display of the even field, and only the odd field is written into the memory during display of the odd field.

Advantageously, for the case where images of 24 frames per second must be displayed at 60 fields per second, and for a couple of bidirectional frames, one of the frames of the couple is decoded twice in succession and the other frame is decoded three times in succession, each time with the display of a field, beginning before half the period of the corresponding decoding operation.

To carry this method into effect, and for the case where images of 24 frames per second must be displayed at 60 fields per second, the apparatus is provided with means for decoding, during treatment of a couple of bidirectional frames, one of the frames of the couple twice in succession and for decoding the other frame three times in succession, and means for each time commencing the display of a field before half the period of the corresponding decoding operation.

A control by way of sections each having a capacity of one line of blocks may advantageously be effected also for intraframes or predicted frames, for which control each section having a capacity of one line of blocks used by a part of the field is reallocated for storing a part of the field which has just been decoded if the contents of this section have already been displayed and if it is no longer used as a reference for decoding a bidirectional frame.

To carry this method into effect, the apparatus is provided with means for realising a control by way of sections each having a capacity of one line of blocks also for the intraframes or predicted frames, and said means reallocate each section having a capacity of one line of blocks used by a part of the field for storing a part of the field which has just been decoded if the contents of this section have already been displayed and if it is no longer used as a reference for decoding a bidirectional frame.

Thanks to the memory space thus gained, the whole memory capacity intended for storing decoded frames can be located in the same memory unit having a capacity of sixteen megabits, in which unit the remaining space is sufficient for the frames received for decoding to be stored in addition to the decoded frames.

These and other aspects of the invention will be apparent from and elucidated with reference to the embodiments described hereinafter.

DESCRIPTION OF PREFERRED EMBODIMENTS

Although the invention relates to the decoding process, a preliminary description of the encoding process will provide a better comprehension of the decoding method and device in a receiving apparatus.

The compression algorithms for the animated images make use of special treatments (discrete cosine transform, adaptive quantization, entropy encoding) and temporal treatment (motion compensation, temporal interpolation).

Frames of three types are defined:
frames referred to as I ("intra") encoded without reference to other frames,
frames referred to as P ("predicted"), encoded with reference to the preceding frame which itself is of the type I or P,
frames referred to as B, ("bidirectional") interpolated while using motion compensation with respect to a frame I or P which it precedes and a frame I or P which it follows.

The predictions used for the bidirectional frames are always produced from the adjacent I or P frames. Thus, the I and P frames play a particular role because they serve as reference frames for the motion compensations.

An example of the sequence of frames before encoding is the following, the upper line indicating the type of frame, I, P or B which is produced by the encoder from the received frames, all of which are obviously, before encoding, defined without reference to other frames, and the lower line indicating the order of arrival of these frames:

type: I B B P B B P B B . . .

order of arrival : 0 1 2 3 4 5 6 7 8. . .

Figure 1:
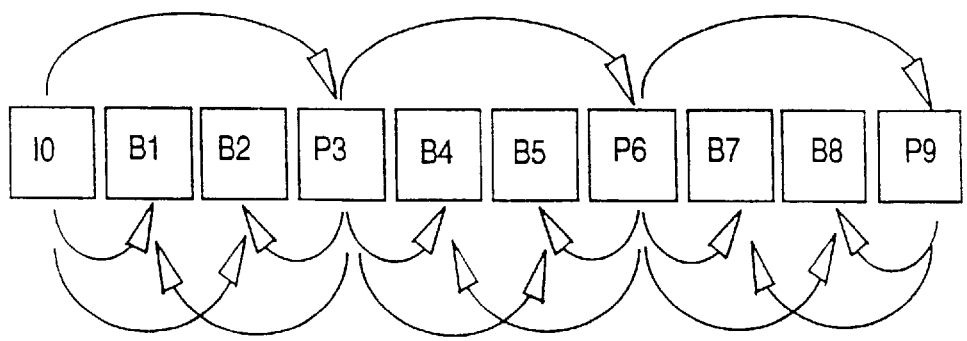
FIG. 1 illustrates the encoding of the frames relative to one another.

FIG. 1 illustrates the frames from which the others are generated. The frame P3 is generated from frame I0, the frames B1 and B2 are generated from the frames I0 and P3, the frame P6 is generated from frame P3, the frames B4 and B5 are generated from frames P3 and P6, the frame P9 is generated from frame P6, the frames B7 and B8 are generated from frames P6 and P9, etc.

The third frame P3 is created in the encoder from the first frame I0, so that it leaves this encoder after said frame IO, the first and second bidirectional frames are created from the frames I0 and P3 so that they leave the encoder after them, the frame P6 is created from the frame P3, and so forth, and the frames of the above-mentioned example leave the encoder (and thus arrive at the decoder) in the following order:

type: I P B B P B B . . .

corresponding to the initial order of arrival: 0 3 1 2 6 4 5. . .

The horizontal and vertical dimensions of a frame are referred to as DIMH and DIMV. The encoding mode may be either the frame mode, in which case the frame is applied in the form of a table having a format of DIMH×DIMV, or in the field mode, in which case the frame is applied in the form of two successive fields of the dimension DIMH×DIMV/2. Each frame (or field) is cut up into blocks whose horizontal and vertical dimensions are H and V, respectively. As usual, H and V have values of 8 pixels or 16 pixels.

As far as decoding upon reception is concerned, the order of leaving the decoder, which should correspond to the order of display of the frames on the screen, is the same as the order of arriving at the encoder upon transmission:

type: I B B P B B P. . .

leaving order: 0 1 2 3 4 5 6. . .

The display is always effected field by field and is based on lines.

When a predictive and interpolating encoding mode is used (bidirectional frames), the frames may be rearranged at the level of the decoder which necessitates a particular control of the memory.

Figure 2:
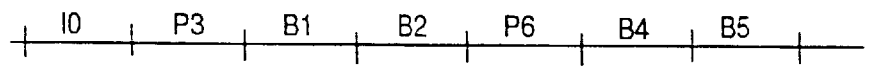
FIG. 2 shows a time diagram in a prior-art method.
Figure 2:
Figure 2:
Figure 2:
Figure 2:
Figure 2:

The time diagram of the decoding procedure in accordance with the cited document is shown in FIG. 2. The top line indicates the instants of arrival of the frames I0, P3, B1, etc. at the decoder. In this known procedure, two reference frames I or P are stored in four pages denoted P1, P2, P3, P4 each containing a field (0e, 0o, 3e, 3o), and parts of decoded bidirectional frames are stored in a page denoted PB. The page PB is divided into "line-of-block zones", in which a "line-of-block zone" is a memory space which can contain a line of blocks from a field, containing V lines of DIMH pixel each for the luminance. Such a zone contains, for example 720×16 pixels in the standard definition. The frames are displayed at a double rhythm with respect to that at which they are decoded, which corresponds to coding at 30 Hz and display at 60 Hz, or to coding at 25 Hz and display at 50 Hz. The display of the first and second fields of the frame B1, whose decoding is indicated as 1, corresponds to the periods indicated as 1e an 1o. It starts approximately in the middle of decoding 1; half the frame is then stored in the memory PB, which should thus be able to contain it.

Figure 3:
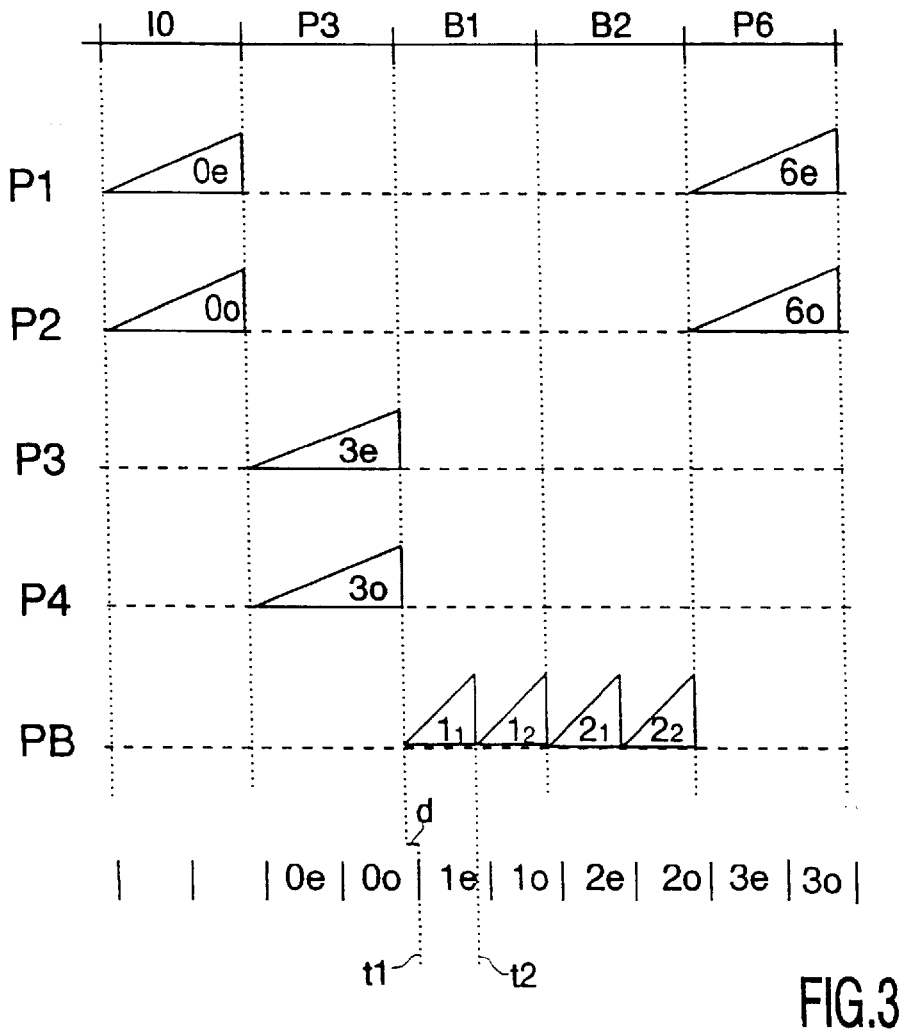
FIG. 3 is a time diagram in the method according to the invention.

A time diagram according to the invention is shown in FIG. 3, corresponding to the case of coding at 30 Hz and display at 60 Hz, or to coding at 25 Hz and display at 50 Hz. The field displays are indicated at the bottom of the Figure, each time between two vertical lines. From the start of decoding $1_1$, at the end of a time denoted d which is shorter than the time of decoding half a frame, the page PB contains N lines of blocks obtained from decoding $1_1$ of the frame B1, which blocks are required to display the field 1e and the display of the field 1e can start at the time denoted t1. When the decoding $1_1$ of the frame B1 is ended, a second identical decoding $1_2$ is started again at the time t2 for providing the field 1o. The memory then contains the last lines of the even field 1e. The second decoding $1_2$ of the frame B1 can only proceed when the memory containing the lines of blocks at the bottom of the field 1e becomes free by the process of displaying them. The same process will be applied to decoding of the frame B2, with two decoding operations $2^1$ and $2_2$, providing the field 2e and the field 2o, respectively.

The field 1e of B1 may be displayed as soon as one line of blocks has already been decoded. The minimum memory size of page PB would be 2×V×DIMH, that is, two lines of blocks: one in the process of decoding and writing, the other in the process of reading for display. Nevertheless, decoding may begin a bit beforehand as compared with the display so as to compensate for possible time variations when decoding a line of blocks. This time varies in dependence upon the contents of the compressed frame, and the time of decoding a single line of blocks may be longer than the time of displaying a line of blocks, which time is always the same. Then there may be a risk that the decoding of the next line of blocks is not ended at the instant when it must be displayed. When the elapsed time of decoding in progress corresponds to the average decoding time of a certain number N of lines of blocks, it will be possible in practice to start displaying the lines that have already been decoded, and this with a sufficient security.

It will be supposed that the decoding time of a frame, referred to as Tdec, is at most equal to a frame period T(frame) for the frames I or P, and equal to T(frame)/2 for the bidirectional frames, T(frame) being equal to 40 mS in a 50 Hz system or 33 mS in a 60 Hz system. The decoding duration of a line of blocks depends on the contents of the frame to be decoded and is also limited. The decoding time of a line of blocks consequently follows a complex rule of probability. The decoding time is supposed to be linear, that is, the duration of decoding of a line of blocks is substantially equal to (V/DIMV)*Tdec for the frames I or P and equal to (V/DIMV x Tdec)/2 for the bidirectional frames. However, according to the invention, devices are provided which are necessary for the cases where decoding is performed in advance or afterwards with respect to the model used.

Between the start and the end of displaying each field of a bidirectional frame, the memory zones corresponding to lines of blocks are reallocated as soon as these lines have been displayed.

Figure 4:
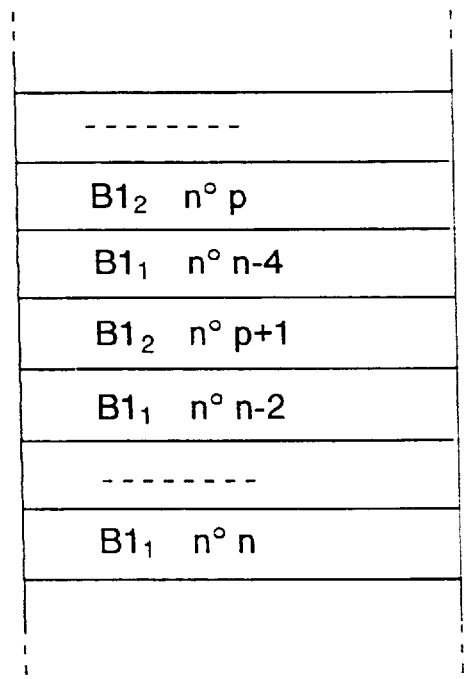
FIG. 4 illustrates the control of a part of a memory page containing the lines of blocks of bidirectional frames.

FIG. 4 shows a state of a part of the page PB, with each rectangle representing a memory zone for a line of blocks. The state at the instant t2 in FIG. 3 is concerned, that is, when the even frame 1e has almost completely been displayed and when the decoding $1_2$ starts. For example, the indication "$B1_2$ no. p+1" denotes that the memory zone in question contains the line of blocks of number "p+1" obtained from the second decoding of the bidirectional frame B1. A line of blocks obtained from the first decoding of the bidirectional frame B1, which was located before $B1_2$ no. p, has already been displayed and the memory zone is thus free (—). Similarly, a line of blocks between "$B1_1$ no. n−2" and "$B1_1$ no. n" obtained from the first decoding of the bidirectional frame B1, has already been displayed and the memory zone is thus free (—).

With this type of control a memory space between the minimum size (2×V×DIMH) and the maximum size DIMH× DIMV can be used for the page PB.

Frame sequence tests may be performed with different values of Tdec and the number N of line-of-block zones in the memory, without a priori knowing an exact limit for the decoding time Tdec, so as to find the optimum couple of values for Tdec and for the memory size allocated to the lines of blocks of the bidirectional frames.

Inversely, if the memory size allocated to the lines of blocks for the bidirectional frames is fixed, the operating frequency of the decoding system can be determined so as to finalize the value of Tdec which would comply with the restrictions of such a memory size allocated for storing the lines of blocks of the bidirectional frames.

For a system where the decoding time is linear, the typical size for the page PB is 3×2×V×DIMH, being six lines of blocks (N=6). The principle described above is similarly applicable to a 60 Hz system, with coding at 30 Hz, while the pages P1, P2, P3, P4, PB are always arranged in lines of blocks.

In the case of a 60 Hz system a decoder should be capable of decoding a sequence encoded at 30 or 60 Hz as described above but also a film sequence encoded at 24 Hz (whereas in a 50 Hz system all the sequences are encoded at 25 or 50 Hz).

Figure 5:
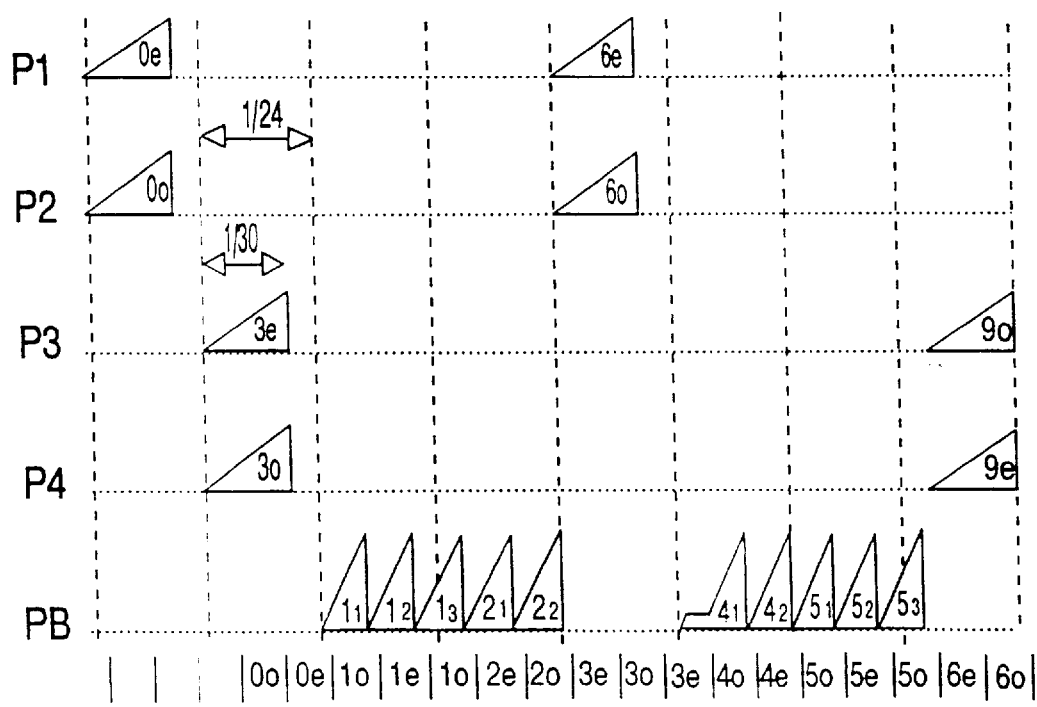
FIG. 5 is a time diagram in the method according to the invention in the case of cinema images of 24 frames per second to be displayed in the form of 60 fields per second.

FIG. 5 shows the sequence of decoding at 24 Hz and display at 60 Hz. As the frames must be presented at 30 Hz, the decoding of the frames only lasts 1/30 second for the frames I or P and 1/60 S for the bidirectional frames. On the other hand, the encoding pace is 24 Hz and the frames to be decoded arrive every 1/24 second. The field displays are indicated at the bottom of the Figure, each time between two vertical lines.

For obtaining a display frequency which is larger than the number of available frames, a field is displayed twice every two frames (here: field 1o is displayed again after field 1e, field 3e is displayed again after field 3o, etc.). Moreover, because this second supplementary field 3e is even, the next field should be odd, which leads to a subsequent display of 4o instead of 4e). It should also be noted that at the start of decoding $4_1$, one is not ready to display the field 4o. Due to this fact, the decoding stops at due to lack of available space in the memory and starts again as soon as the field 4o is about to be displayed. The corresponding delay delays the subsequent decoding ($4_2$, $5_1$, $5_2$, $5_3$) which leads to a delay in decoding the predicted field which follows (P9), but nevertheless 1/30 second remains available before the arrival of the next frame, after which everything is in place again.

The number of delay fields between display and decoding should be constant. At 60 Hz, in case of a film encoded at 24 Hz, from the start of decoding a field of the intra-type (Oe), three field displays must be counted and the fourth corresponds to the display of the intraframe field in question (Oo).This is actually needed only in the case of a film at 24 Hz, but for simplifying the process, the same is made in all cases. This constitutes a considerable difference with respect to a 50 Hz system in which (FIG. 3) only two displays are counted from the start of decoding a field of the intra-type (O*e*), while the third corresponds to the display of the intraframe field in question (O*e*).

Figure 6:
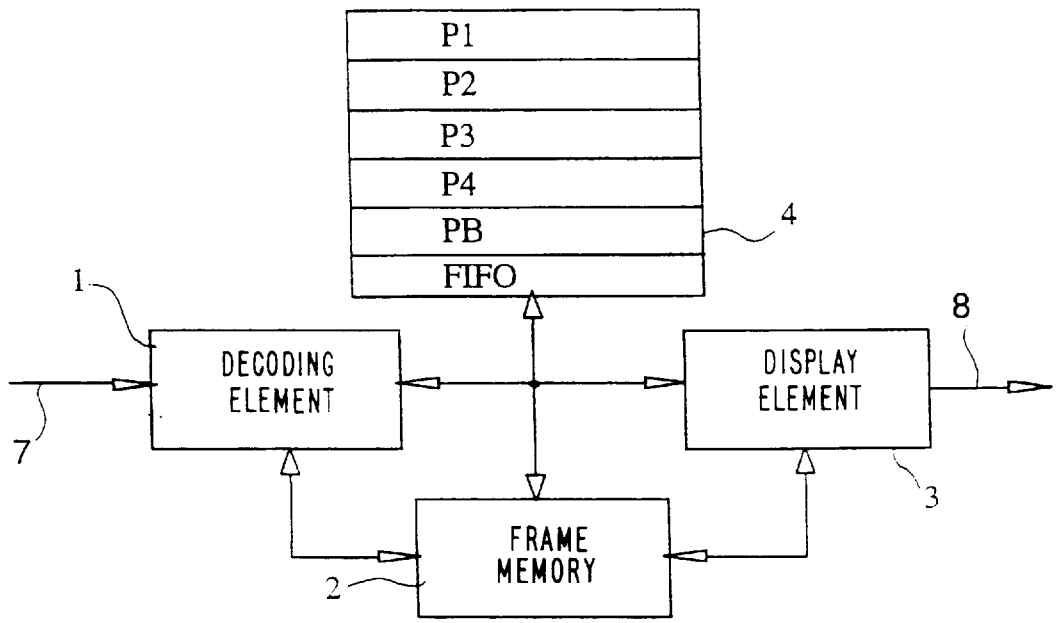
FIG. 6 shows diagrammatically the division of a decompression and decoding device in a receiving apparatus according to the invention, with a memory divided into pages P1 to P4 and PB.

FIG. 6 shows the division of a system for decompressing and decoding animated images in a receiving apparatus. It is functionally divided into four elements:

a memory 4 divided into four pages P1, P2, P3, P4 used for containing an intra-field or predicted field each, and a fifth page PB which is divided into zones referred to as line-of-block zones which are used for storing a line of blocks of a bidirectional frame each. The memory 4 also comprises a zone denoted "FIFO" which is used for storing the frames received by the decoder.

a decoding element 1 for decoding and decompressing frames received in a compressed form by a conductor 7 (coming from receiving and demodulation elements in the receiving apparatus, which elements are known per se and are therefore not shown), and for writing into the external memory 4, a display element 3 which reads the decoded frames from the external memory for supplying them via a conductor 8 to a display device of the receiving apparatus (which display device is known per se and is therefore not shown) in synchronism with the video synchronizing signals, a control element of the frame memory 2, with which the invention can be carried into effect.

The control element of the frame memory 2 applies to the decoding element 1:

the memory addresses at which the beginning of each line of blocks of the frame during decoding is written, the memory addresses of the prediction fields used for the motion compensations (past and future references).

For bidirectional frames this element functions on the basis of the following rule: every zone used by a line of blocks may be reallocated for storing a line of blocks during decoding if its contents have already been displayed. Such a control of the memory is well known in the field of informatics and a description with reference to its function is thus sufficient to those skilled in the art.

For each new line of blocks during decoding from a bidirectional frame, the control element of the frame memory 2 allocates two lines of blocks in the case of frame coding and one line of blocks in the case of field coding. If no line-of-block memory is available, the decoding process is stopped until two lines of blocks are available in page PB. If this tends to happen, a larger zone should be reserved for page PB at the start.

The control element of the frame memory 2 is also in charge, for each new decoded frame I or P of the allocation of two memory zones containing fields which have already been displayed for storing the frame to be decoded. If the frame contained in a field zone is being displayed, a control at the level of the lines of blocks may also be effected by the control element of the frame memory, for the frames I or P in addition to that realised for the bidirectional frames. The control element of the frame memory 2 then functions in accordance with the following rule: every zone utilized by a field or line of blocks may be reallocated for storing a field or line of blocks of the same type during decoding if its contents have already been displayed and if it is no longer used as a reference for the motion compensations. Thus, if the line of blocks number "n" of a memory P1 to P4 is completely displayed, it can be used for storing the line of blocks number "p" (with p <n) of the frame I or P that is being decoded if no other field memory is available. Thus, for example in the case of a purely predictive encoding procedure without bidirectional frames, while the frames P are received by the decoder at a rate which is higher than in the case where the bidirectional frames are inserted between the frames P, the memory P1 or the memory P3, arranged in lines of blocks, may contain the lower half of an even field in its lower part and the beginning of the next even field in its upper part, and similarly the memory P2 or the memory P4, arranged in lines of blocks, may contain the lower half of an odd field in its lower part and the beginning of the next even field in its upper part.

Upon each request by the display element, the control element of the frame memory 2 supplies to the display element the memory address corresponding to the beginning of each line of blocks of the frame to be displayed, which is effected every V display lines.

As the display process must have priority, it must never be effected in anticipation of the data necessary for display, except when the decoding process should be interrupted by a default of compressed data at the input of the decoding process. The display process releases the memory per line-of-block zones, which zones are subsequently reallocated by the control element of the frame memory 2 for storing the lines of blocks during decoding.

Figure 7:
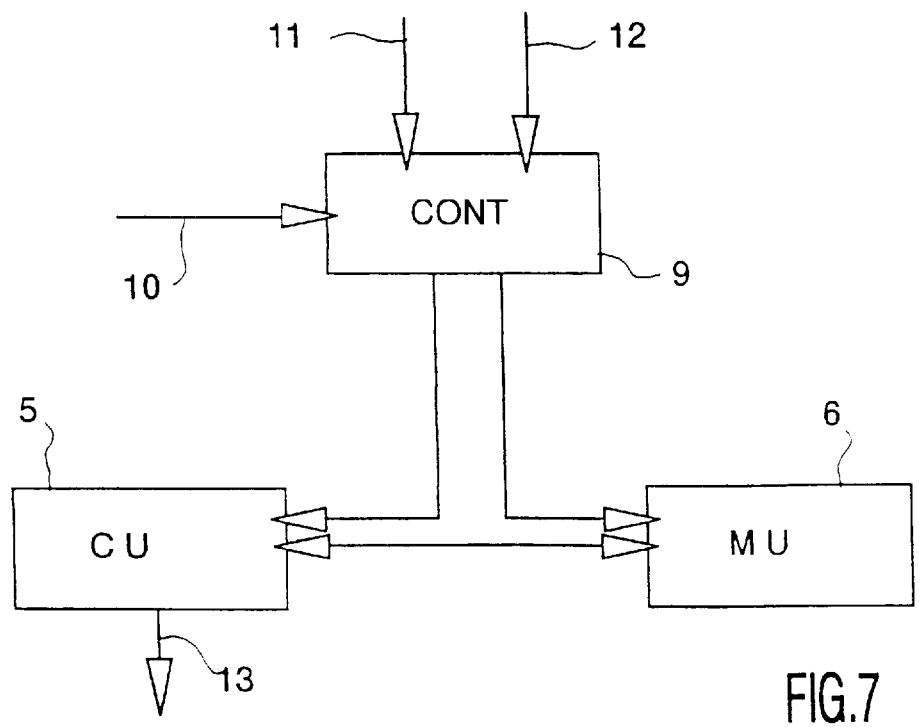
FIG. 7 shows diagrammatically the structure of the element 2 of FIG. 6.

FIG. 7 shows the internal division of the control element of the frame memory 2 of FIG. 6. This element is constituted by three modules: a control module 9, a "memory unit" module 6 and a "computation unit" module 5.

The control module 9 receives from the decoding element 1, via a conductor 10, the information from the binary series corresponding to the characteristics of the decoded frame, notably:

the type of frame, the type of coding, the type of sub-sampling of the chrominance.

It also receives from the same decoding element, via a conductor 11, the memory allocation requests for the next line of blocks to be decoded.

On its part, the display element 3 requests the module 9, via a conductor 12, to supply the memory address at which the display element must read the next line of blocks to be displayed from the external memory 4. Upon each request of the memory address, the control module will search the memory unit (denoted MU) which contains the information relating to each line of blocks present in the external memory, and the memory unit provides an index for the computation unit 5 (denoted CU), which index is decoded to supply the external memory address. For example, upon each request of the memory address from the decoding element, the control module searches the unit MU and if no line-of-block zone is available, the decoding operation is stopped in anticipation of clearing a memory space corresponding to a line of blocks, whereas if a line-of-block zone is available, the unit MU will supply an index to the unit CU which generates the corresponding address in the external memory 4 and will supply it to the decoding element 1 via a conductor 13.

If an address for display is not available, in other words if the decoding process is not effected correctly, the control element of the frame memory 2 supplies the display element 3 with addresses of the line-of-block memory zones associated with the last frame I or P available in the memory with a view to furnishing a frame which is close enough to the frame which is displayed normally.

The unit MU is constituted by a memory and an address generator. As the number of lines of blocks stored in the memory is limited, the index of the line of blocks in the external memory is used as an address for the memory of the unit MU. The data associated with this address are constituted by two fields:

data: corresponding to the index of the line of blocks in the frame control: containing all the control information associated with the line of blocks in the memory.

The control module 9 always works in anticipation with respect to the requests of the decoding element 1 and the display element 3. During decoding (or displaying) the line of blocks number "n", it computes the memory address at which the line of blocks number "n+1" must be written (or read, respectively).

A memory control on basis of complete frames would lead to storing three frames, that is to say, with a sub-sampling format of a factor two, horizontally and vertically for the chrominance:

$$3 \times 720 \times 576 \times 12 = 14.930 \; megabits.$$

If a system for decoding frames is to be constructed with 16 Mbits of dynamic memory, there are only 1.847 megabits available for storing the compressed frames.

By referring to the number of bits per pixel as "NBBP", the invention uses only (2×DIMH×DIMV×NBBP) plus (N×DIMH×V×NBBP) bits in total for the decoded frames, that is to say, in practice: 2×720×576×12 plus 3×2×16×720× 12 bits, that is, 10.783 megabits for the memory part of the pixels. Consequently, in a system provided with a 16-megabit memory, 5.990 megabits can be used for storing the compressed frames as well as any other information such as compressed audio data, system data, data for realizing the display of graphic information.

We claim:

1. A method of decoding frames which have been digitally encoded using a compression algorithm, in which method a fixed number of pixels are to be processed per unit of time, and wherein each frame includes at least an odd field and an even field and is divided into blocks of pixels each comprising several pixels in both horizontal and vertical directions, and wherein a line of blocks is defined as a plurality of blocks which, side by side, occupy the length of a frame line, said compression algorithm being based on processing of blocks transmitted sequentially, and wherein the frames include three different types of frames, including intraframes which are encoded in absolute values without reference to other frames, predicted frames which are encoded with reference to a preceding intraframe or predicted frame, and bidirectional frames which are encoded on the basis of a maximum number of two other frames which are each intraframes or predicted frames, the method comprising the steps of:

displaying an even field and an odd field of each frame after decoding the same;

displaying certain bidirectional frames before one of the intraframes or predicted frames used for decoding the same;

decoding the bidirectional frames in successive stages of one line of blocks at a time;

dividing a memory space into zones each having a capacity of one line of blocks for storing lines of blocks of a bidirectional frame which has just been decoded;

progressively replacing contents of one of said zones already displayed by each line of blocks which has just been displayed;

decoding each bidirectional frame at least twice in succession;

decoding a first one of the fields, odd or even, of a frame in a first decoding operation, and decoding the other one of the fields, even or odd, of the frame being decoded during a second decoding operation;

starting the display of the other one of the fields, even or odd, derived from results of the first decoding operation before half of a period of the first decoding operation is completed; and, starting the display of the first one of the fields, odd or even, derived from results of the second decoding operation before half of a period of the second decoding operation is completed.

2. A method as claimed in claim 1, wherein the method is adapted for decoding frames at a rate of 25 frames per second.

3. A method as claimed in claim 1, wherein the method is adapted for decoding frames at a rate of 30 frames per second.

4. A method as claimed in claim 1, wherein:

the method is adapted for displaying images of 24 frames per second at 60 fields per second;

for a couple of bidirectional frames, one of the couple of bidirectional frames is decoded twice in succession and the other one of the couple of bidirectional frames is decoded three times in succession, each time with the display of a field, beginning before half of a period of the corresponding decoding operation.

5. A method as claimed in claim 1, further comprising the steps of:

decoding the intraframes and predicted frames in successive stages of one line of blocks;

dividing a further memory space into a plurality of further memory zones each having a capacity of one line of blocks for storing lines of an intraframe or predicted frame which has just been decoded; and, progressively replacing the contents of one of said further memory zones which has already been displayed by a line of an intraframe or predicted frame which has just been decoded, if it is no longer required to be used as a reference to decoding a bidirectional frame.

6. A method as claimed in claim 1, wherein said memory space and said further memory space have a combined capacity of sixteen megabits, which is sufficient for also storing frames received for decoding.

7. A receiving apparatus, comprising:

means for decoding frames which have been digitally encoded using a compression algorithm, by processing a fixed number of pixels are per unit of time, wherein each frame includes at least an odd field and an even field and is divided into blocks of pixels each comprising several pixels in both horizontal and vertical directions, and wherein a line of blocks is defined as a plurality of blocks which, side by side, occupy the length of a frame line, said compression algorithm being based on processing of blocks transmitted sequentially, and wherein the frames include three different types of frames, including intraframes which are encoded in absolute values without reference to other frames, predicted frames which are encoded with reference to a preceding intraframe or predicted frame, and bidirectional frames which are encoded on the basis of a maximum number of two other frames which are each intraframes or predicted frames;

means for displaying an even field and an odd field of each frame after decoding the same, and for displaying certain bidirectional frames before one of the intraframes or predicted frames used for decoding the same;

means for decoding the bidirectional frames in successive stages of one line of blocks at a time;

a memory space divided into zones each having a capacity of one line of blocks for storing lines of blocks of a bidirectional frame which has just been decoded;

means for progressively replacing contents of one of said zones already displayed by a line of blocks which has just been decoded;

means for decoding each bidirectional frame at least twice in succession and decoding a first one of the fields, odd or even, of a frame in a first decoding operation, and decoding the other one of the fields, even or odd, of the frame being decoded during a second decoding operation; and, means for starting the display of the other one of the fields, even or odd, derived from results of the first decoding operation before half of a period of the first decoding operation is completed, and for starting the display of the first one of the fields, odd or even, derived from results of the second decoding operation before half of a period of the second decoding operation is completed.

8. A receiving apparatus as claimed in claim 7, wherein the apparatus is adapted for decoding frames at a rate of 25 frames per second.

9. A receiving apparatus as claimed in claim 7, wherein the apparatus is adapted for decoding frames at a rate of 30 frames per second.

10. A receiving apparatus as claimed in claim 7, wherein the apparatus is adapted for displaying images of 24 frames per second at 60 fields per second, and further comprising:

means for decoding, during processing of a couple of bidirectional frames, one of the couple of bidirectional frames twice in succession and for decoding the other one of the couple of bidirectional frames three times in succession; and, means for each time starting the display of a field before half of a period of the corresponding decoding operation.

11. A receiving apparatus as claimed in claim 7, further comprising:

means for decoding the intraframes and predicted frames in successive stages of one line of blocks;

a further memory space divided into a plurality of further memory zones each having a capacity of one line of blocks for storing lines of an intraframe or predicted frame which has just been decoded; and, means for progressively replacing the contents of one of said further memory zones whose contents have already been displayed by a line of an intraframe or predicted frame which has just been decoded, if it is no longer required to be used as a reference to decoding a bidirectional frame.

12. A receiving apparatus as claimed in claim 7, wherein said memory space and said further memory space have a combined capacity of sixteen megabits, which is sufficient for also storing frames received for decoding.

\* \* \* \* \*